(12) United States Patent
Simoncelli

(10) Patent No.: US 11,025,454 B2
(45) Date of Patent: Jun. 1, 2021

(54) STATE ANALYSIS OF REMOTE COMPUTING IMAGES

(71) Applicant: Red Hat, Inc., Raleigh, NC (US)

(72) Inventor: Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/707,012

(22) Filed: Dec. 9, 2019

(65) Prior Publication Data

US 2020/0119949 A1    Apr. 16, 2020

Related U.S. Application Data

(63) Continuation of application No. 15/239,024, filed on Aug. 17, 2016, now Pat. No. 10,615,998.

(51) Int. Cl.
   *G06F 15/173*    (2006.01)
   *H04L 12/46*     (2006.01)
   *H04L 29/08*     (2006.01)

(52) U.S. Cl.
   CPC ...... *H04L 12/4641* (2013.01); *H04L 67/1097* (2013.01); *H04L 67/02* (2013.01)

(58) Field of Classification Search
   CPC ............. H04L 12/4641; H04L 67/1097; H04L 67/02; G06F 3/06
   USPC ....................................................... 709/223
   See application file for complete search history.

(56) References Cited

U.S. PATENT DOCUMENTS

| 7,519,814 | B2 | 4/2009 | Rochette et al. |
| 7,752,624 | B2 | 7/2010 | Crawford, Jr. et al. |
| 8,621,069 | B1 | 12/2013 | Tompkins |
| 9,032,506 | B2 | 5/2015 | Parla et al. |
| 9,256,467 | B1 | 2/2016 | Singh et al. |
| 9,756,070 | B1 * | 9/2017 | Crowell ............... G06F 9/45533 |
| 2009/0248814 | A1 * | 10/2009 | Kelly ....................... H04L 51/12 709/206 |

(Continued)

FOREIGN PATENT DOCUMENTS

CN    105245373    1/2016

OTHER PUBLICATIONS

Mouat, Adrian, "Swarm v. Fleet v. Kubernetes v. Mesos— Comparing Different Orchestration Tools", 14 pages, Oct. 21, 2015, https://www.oreilly.com/ideas/swarm-v-fleet-v-kubernetes-v-mesos.

(Continued)

*Primary Examiner* — Atta Khan
(74) *Attorney, Agent, or Firm* — Lowenstein Sandler LLP

(57) ABSTRACT

Disclosed herein is technology for analyzing a computing image (e.g., container image, virtual disk image) while it is on a remote node in a secured environment. An example method may involve: initiating, by a first computing device, an execution of a proxy agent on a second computing device, the proxy agent having access to an image repository comprising an image; transmitting, by the proxy agent, a request for image data of the image, wherein the request comprises information indicating a particular portion of the image to be read using a file system operation; storing the image data that comprises data at the particular portion of the image; and analyzing the image data in view of one or more rules to determine a state of the image, wherein the state indicates a status of at least one of a computer program feature, an operating system feature, or a hardware feature.

18 Claims, 5 Drawing Sheets

(56) References Cited

U.S. PATENT DOCUMENTS

| | | | |
|---|---|---|---|
| 2011/0047340 A1* | 2/2011 | Olson | G06F 11/1464 |
| | | | 711/162 |
| 2011/0289584 A1* | 11/2011 | Palagummi | G06F 21/562 |
| | | | 726/24 |
| 2013/0247036 A1* | 9/2013 | Fujiwara | G06F 9/455 |
| | | | 718/1 |
| 2014/0280465 A1* | 9/2014 | Pakula | H04L 67/02 |
| | | | 709/203 |
| 2015/0309849 A1 | 10/2015 | Lau et al. | |
| 2016/0266892 A1* | 9/2016 | Sn | G06F 8/658 |

OTHER PUBLICATIONS

"Docker Clustering Tools Compared: Kubernetes vs Docker Swarm", 2015, 11 pages, https://technologyconversations.com/2015/11/04/docker-clustering-tools-compared-kubernetes-vs-docker-swarm/.

Jambunatha, Baskaran, et al., "Multi Cloud Deployment with Containers", Research Scholar, Dept. of Computing Science, Vels University, Chennai, Tamil Nadu, India, Feb.-Mar. 2016, 8 pages, http://www.enggjournals.com/ijet/docs/IJET16-08-01-089.pdf.

Lamourine, Mark, "Intro to Containerized Applications: Docker and Kubernetes", Red Hat, Inc Billerica, MA, Aug. 27, 2014, 10 pages, http://cloud-mechanic.blogspot.in/2014/08/intro-to-containerized-applications.html.

\* cited by examiner

STATE ANALYSIS OF REMOTE COMPUTING IMAGES

RELATED APPLICATIONS

The present application is a continuation of application Ser. No. 15/239,024, filed Aug. 17, 2016, entitled "State Analysis of Remote Computing Images," which is incorporated by reference herein.

TECHNICAL FIELD

The present disclosure is generally related to analyzing the state of a computing image, and is more specifically related to analyzing a computing image while it is on a remote node in a secured environment.

BACKGROUND

The virtualization of a data center results in a physical system being virtualized using virtual machines to consolidate the data center infrastructure and increase operational efficiencies. A virtual machine (VM) may be an emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple virtual machines sharing physical resources.

The physical systems and virtual systems (e.g., virtual machines) may each have a state that can be persisted and stored as an image. The state of a physical system may be stored as a hard disk image and the hard disk image may be used to configure one or more other physical systems. The state of a virtual machine may be stored as a virtual machine disk image and may be used to run one or more virtual machines. Either type of image may contain the state of the system at a point in time and may be updated to reflect changes that occur to the system over time.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
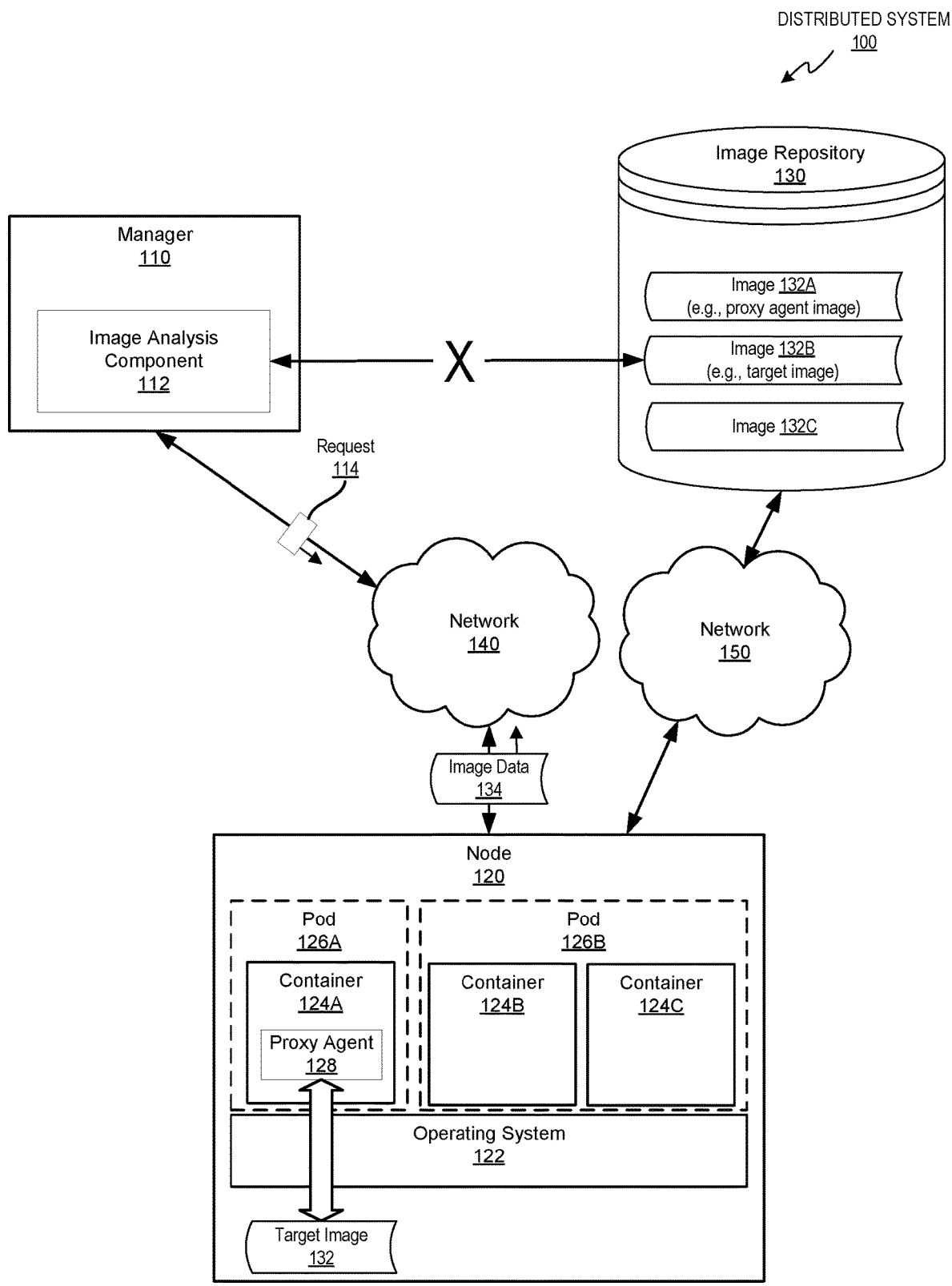
FIG. 1 depicts a high-level block diagram of an example distributed system operating in accordance with one or more aspects of the present disclosure.

Many modern computing systems enable a state of a computing system to be stored as an image. The image may include confidential or proprietary executables and configuration information that may be loaded onto a node and executed by the node to provide a computing service. Due to the confidential nature of the images, the images may be stored on an image repository with restricted access to enhance security. For example, the image repository may be accessible to a node executing the image but may not be accessible to a management server. The management server may manage the one or more nodes in the computing environment and may determine which nodes execute which images. The management server may base its operations on the state of the images and the enhanced security may adversely affect the ability of the virtualization server to determine the state of the images.

Aspects of the present disclosure address the above and other deficiencies by providing technology for determining the state of an image stored on a remote node when direct access to the image is limited (e.g., no read access). In one example, a computing device may manage the operations of one or more nodes that include physical machines, virtual machines, or a combination thereof and each of the nodes may be capable of accessing and executing images from an image repository. The computing device may have access to the nodes but may not have direct access to the image repository because of security measures in place to protect the images. To gather information about the images the computing device may initiate a proxy agent on a node that has access to an image repository. In one example, the node may provide operating system virtualization that supports one or more containers and the executable proxy agent may run within a container. The container may be a resource-constrained process space of the node that can execute functionality of the proxy agent in a secure manner. Once the proxy agent is running on the node, the computing device may transmit one or more requests to the proxy agent. The requests may include operations or instructions for gathering image data from the image. In one example, the requests may be in the form of network requests (e.g., HTTP requests) that include operations for searching the image for particular image data that represents the state of the image (e.g., operating system features, running programs, hardware architecture). The computing device may then receive, store, and analyze the image data to determine the state of the image.

The systems and methods described herein include technology that enhances the performance of image state analysis. In particular, aspects of the present disclosure may enable a computing device to analyze an image in a secured environment without accessing the image directly or downloading the image locally. Aspects of the present disclosure may also enable the image analysis logic to be centralized (e.g., consolidated). Centralizing the image analysis logic on the computing device may enable the image analysis logic to be more easily updated or replaced to detect additional or different states of an image. Aspects of the present disclosure may also enable a computing device to analyze an image in a more resources efficient manner. Images are often stored as large files (e.g., multiple gigabytes) and remotely analyzing the image may reduce the amount of data being retrieved from the image and transmitted to the computing device. This may reduce the amount of networking resources, input/output (I/O) resources, processing, memory, or other computing resources consumed to analyze the state of an image.

Aspects of the present disclosure may also enable the data retrieved from the image to be stored and re-analyzed when the image analysis logic is updated (e.g., update to detect new flaw). The subsequent analysis may be done long after the image data was retrieved without re-retrieving or re-transmitting the data from the remote image.

Various aspects of the above referenced methods and systems are described in details herein below by way of examples, rather than by way of limitation. The examples provided below discuss a virtualized environment, but other examples may include a standard operating system running on an individual computing device without virtualization (e.g., without a hypervisor).

FIG. 1 illustrates an example distributed system 100 in which implementations of the disclosure may operate. The distributed system 100 may include a manager 110, a node 120, and an image repository 130 coupled via one or more networks 140 and 150. Networks 140 and 150 may be public networks (e.g., the internet), a private networks (e.g., a local area network (LAN) or wide area network (WAN)), or a combination thereof. In one example, network 140 and 150 may be similar but network 150 may be more secured and restrict access to a subset of the devices (e.g., node 120 and image repository 130). Networks 140 and 150 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Manager 110 may be hosted by a computing device and include one or more computer programs executed by the computing device for centralized management of distributed system 100. In one implementation, the manager 110 may comprise various interfaces, including administrative interface, reporting interface, and/or application programming interface (API) to communicate with node 120, as well as to user portals, databases, directory servers and various other components, which are omitted from FIG. 1 for clarity. Manager 110 may include an image analysis component 112 that interacts with one or more nodes 120 to determine the state of an image on image repository 130.

Node 120 may comprise a computing device with one or more processors communicatively coupled to memory devices and input/output (I/O) devices, as described in more details herein below with references to FIG. 5. Node 120 may include an operating system 122 with one or more user space programs. Operating system 122 may be any program or combination of programs that are capable of using the underlying computing device to perform computing tasks. Operating system 122 may include a kernel comprising one or more kernel space programs (e.g., memory driver, network driver, file system driver) for interacting with virtual hardware devices or actual hardware devices (e.g., paravirtualization). User space programs may include programs that are capable of being executed by operating system 122 and in one example may be an application program for interacting with a user. Although node 120 comprises a computing device, the term "node" may refer to the computing device (e.g., physical machine), a virtual machine, or a combination thereof.

Node 120 may provide one or more levels of virtualization such as hardware level virtualization, operating system level virtualization, other virtualization, or a combination thereof. Node 120 may provide hardware level virtualization by running a hypervisor that provides hardware resources to one or more virtual machines. The hypervisor may be any program or combination of programs and may run on a host operating system or may run directly on the hardware (e.g., bare-metal hypervisor). The hypervisor may manage and monitor various aspects of the operation of the computing device, including the storage, memory, and network interfaces. The hypervisor may abstract the physical layer features such as processors, memory, and I/O devices, and present this abstraction as virtual devices to a virtual machine.

Node 120 (e.g., physical machine or virtual machine) may also or alternatively provide operating system level virtualization by running a computer program that provides computing resources to one or more containers 124A-C. Operating system level virtualization may be implemented within the kernel of operating system 122 and may enable the existence of multiple isolated containers. In one example, operating system level virtualization may not require hardware support and may impose little to no overhead because programs within each of the containers may use the system calls of the same underlying operating system 122. This enables node 120 to provide virtualization without the need to provide hardware emulation or be run in an intermediate virtual machine as may occur with hardware level virtualization.

Operating system level virtualization may provide resource management features that isolate or limit the impact of one container (e.g., container 124A) on the resources of another container (e.g., container 124B or 124C). The operating system level virtualization may provide a pool of resources that are accessible by container 124A and are isolated from one or more other containers (e.g., container 124B). The pool of resources may include file system resources (e.g., particular volume), network resources (e.g., particular network address), memory resources (e.g., particular memory portions), other computing resources, or a combination thereof. The operating system level virtualization may also limit a container's access to one or more computing resources by monitoring the containers activity and restricting the activity in view of one or more limits (e.g., quotas). The limits may restrict the rate of the activity, the aggregate amount of the activity, or a combination thereof. The limits may include one or more of disk limits, input/out (I/O) limits, memory limits, CPU limits, network limits, other limits, or a combination thereof. In one example, an operating system virtualizer provides the computing resources to containers 124A-C. The operating system virtualizer may wrap an application in a complete file system that contains the code, runtime, system tools, system libraries and other programs installed on the node that can be used by the application. In one example, the operating system virtualizer may be the same or similar to Docker for Linux®, ThinApp® by VMWare®, Solaris Zones® by Oracle®, or other program that automates the packaging, deployment, and execution of applications inside containers.

Each of the containers 124A-C may refer to a resource-constrained process space of node 120 that can execute functionality of a program. Containers 124A-C may be referred to as a user-space instances, a virtualization engines (VE), or jails and may appear to a user as a standalone instance of the user space of operating system 122. Each of the containers 124A-C may share the same kernel but may be constrained to only use a defined set of computing resources (e.g., CPU, memory, I/O). Aspects of the disclosure can create one or more containers to host a framework or provide other functionality of an application (e.g., proxy agent functionality, database functionality, web application functionality, etc.) and may therefore be referred to as "application containers."

Pods 126A and 126B may be data structures that are used to organize one or more containers 124A-C and enhance sharing between containers, which may reduce the level of isolation between containers within the same pod. Each pod may include one or more containers that share computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 120. In another example, the containers associated with a particular pod may be located on different nodes that are on the same or different physical machines.

Image repository 130 may be any data store that is capable of storing one or more images 132A-C and being accessed by node 120. Node 120 may remotely access image repository 130 over network 150 or may locally access image repository using a direct connection (e.g., not over a network). Image repository 130 may be stored on a data storage device that includes block-based storage devices, file-based storage devices, or a combination thereof. Block-based storage devices may include one or more data storage devices (e.g., Storage Area Network (SAN) devices) and may provide access to consolidated block-based (e.g., block-level) data storage. Block-based storage devices may be accessible over a network and may appear to an operating system of a computing device as locally attached storage. File-based storage devices may include one or more data storage devices (e.g., Network Attached Storage (NAS) devices) and provide access to consolidated file-based (e.g., file-level) data storage that may be accessible over a network. Image repository 130 may include images 132A-C, storage metadata, and storage lease information. In one example, a secondary storage with image repository 130 may employ block-based storage and images 132A-C, storage metadata, and storage lease may be provided by respective logical volumes. In another example, the secondary storage with image repository 130 may employ file-based storage and images 132A-C, storage metadata, and storage lease may be provided by one or more respective files.

Images 132A-C may be any data structure for storing and organizing information that may be used by node 120 to provide a computing service. The information within images 132A-C may indicate the state of the image and may include executable information (e.g., machine code), configuration information (e.g., settings), or content information (e.g., file data, record data). Each of the images 132A-C may be capable of being loaded onto node 120 and may be executed to perform one or more computing tasks. Images 132A-C may be container images, virtual machine images, disk images, other images, or a combination thereof. A container image may include a user space program (e.g., application) along with a file system that contains the executable code, runtime, system tools, system libraries and other programs to support the execution of the user space program on node 120. The container image may not include an operating system but may be run by an operating system virtualizer that is part of an existing operating system of node 120. A virtual machine image may include both an operating system and one or more user space programs. The virtual machine image may be loaded onto node 120 and may be run by a hypervisor. A disk image may be the same or similar to a virtual machine image (e.g., virtual disk image) but may be loaded onto node 120 and run without using a hypervisor or other form of virtualization technology. In one example, an image may be generated by creating a sector-by-sector copy of a source medium (e.g., hard drive of example machine). In another example, a disk image may be generated based on an existing image and may be manipulated before, during, or after being loaded and executed. The format of images 132A-C may be based on any open standard, such as the ISO image format for optical disc images, or based on a proprietary format.

One or more of the images 132A-C may represent a chain of volumes comprising one or more copy-on-write (COW) volumes (which may also be referred to as "layers"). From the perspective of node 120, the volumes may appear as a single image. Initially, an image may comprise one raw or COW volume, which may be made read-only before the first boot of the virtual machine. An attempt to write to a disk by a virtual machine may modify the image or may trigger adding a new COW volume ("layer") to the volume chain. The newly created volume may store disk blocks or files that have been modified or newly created by the virtual machine after the previous volume ("layer") has been made read-only. One or more volumes may be added to the volume chain during the lifetime of the virtual machine. In some implementations, making the previous volume read-only (e.g., responsive to receiving a command via an administrative interface) triggers adding of a new COW volume. The virtual disk device implemented by the hypervisor locates the data by accessing, transparently to the virtual machine, each volume of the chain of volumes, starting from the most recently added volume.

Image repository 130 may include a proxy agent image and a target image. In the example shown in FIG. 1, the proxy agent image may be a container image and may be run within container 124A on node 120. In other examples, proxy agent image may be a virtual machine image and may be run as a virtual machine on node 120. In either example, the proxy agent image (e.g., image 132) may be retrieved and loaded onto node 120 and provide the functionality of proxy agent 128.

Proxy agent 128 may interact with image analysis component 112 of manager 110 and may access one or more images on node 120, image repository 130, or a combination thereof. Proxy agent 128 may be advantageous because manager 110 may not have access to the images due to existing security measures but may initiate proxy agent 128 on a node with access to the images. In one example, proxy agent 128 may retrieve the image 132B from image repository 130 and may store image 132B locally as target image 132 (e.g., dormant image). In another example, target image 132 may already be executing on node 120 and image analysis component 112 may initiate proxy agent 128 on node 120 so that proxy agent 128 has access to target image 132 while it is running. In either example, proxy agent 128 may receive requests 114 from image analysis component 112 and may access the target image 132 to gather image data 134 from the target image 132 and send it to the image analysis component 112. The features of image analysis component 112, request 114, and image data 134 will be discussed in more detail in regards to FIG. 2.

Figure 2:
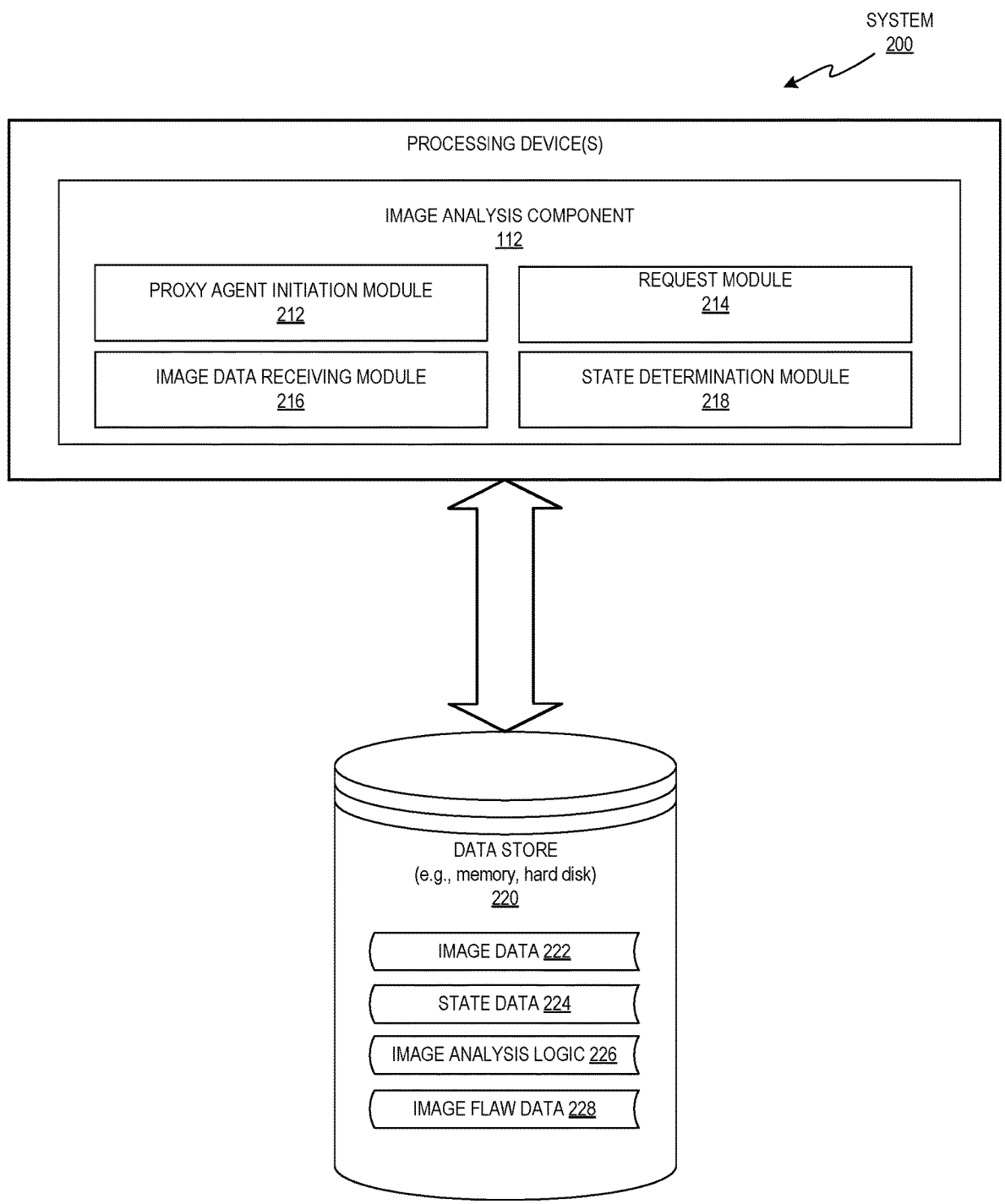
FIG. 2 depicts a block diagram of an example system operating in accordance with one or more aspects of the present disclosure.

FIG. 2 is a block diagram illustrating example components and modules of system 200, in accordance with one or more aspects of the present disclosure. System 200 may be the same or similar to manager 110 of FIG. 2 and may include a data store 220 and an image analysis component 112. Image analysis component 112 may include a proxy agent initiation module 212, a request module 214, an image data receiving module 216, and a state determination module 218.

Proxy agent initiation module 212 may communicate with one or more nodes to initiate a proxy agent on one of the nodes. Proxy agent initiation module 212 may identify a node based on whether the node has access to a particular image (e.g., dormant image or running image) that the system has targeted for analysis. In one example, the proxy agent initiation module 212 may know which images are stored on which image repositories but may not be able to access the target image because of enhanced security (e.g., access restrictions). In another example, the proxy agent initiation module 212 may know details about the images but may not know where the image is stored and which nodes have access to target image. In this latter situation, the proxy agent initiation module 212 may communicate with one or more of the nodes to determine which node has access to the target image.

After identifying a node with access to the image, proxy agent initiation module 212 may send a signal to initiate the proxy agent on the identified node. In one example, the signal may be sent to the node or to a particular container hosted by the node. In another example, the signal may be sent to an intermediate node or other device (e.g., scheduler, manager) which may propagate the signal to the identified node. The signal may identify a particular image (e.g., container image) that includes the proxy agent or application that is functioning as the proxy agent. The particular image may already be on the node or may be stored in an image repository that is the same or different from the image repository that stores the target image being analyzed. The image that includes the proxy agent may be launched or initiated within a container. The container may have existed prior to receiving the signal or may be generated after or in response to the signal. Once the proxy agent is running, it may receive one or more requests from request module 214.

Request module 214 may transmit requests to the proxy agent running on the node and the requests may include data for analyzing a target image accessible to the node. The requests may be the same as request 114 of FIG. 1 and may include data comprising operations, identification information, other data, or a combination thereof. The operations may be any command, procedure, instruction, action, or combination thereof for reading, writing, or executing data accessible by the proxy agent. The operation may be a file system or database operation or may be interpreted or translated to a corresponding file system or database operation. The identification information may be used to determine a particular target image or a particular portion of a target image. The particular target image may originate from a data store (e.g., image repository) that is local to the node or remote from the node and the identification information may include an image repository identifier, an image location identifier (e.g., URL, system path), an image identifier (e.g., file name, UUID), other image identification information, or a combination thereof.

The identification information may also or alternatively be used to determine a particular portion of a target image. The particular portion of the target image may be a data structure (e.g., file, record) within the image or a specific entry (e.g., parameter, setting) within the data structure. In one example, the identification information may be used to identify a particular data structure (e.g., system file) for a web service, application service, database service, other computing service, or a combination thereof. In another example, the identification information may be used to identify a type of data structure such as any configuration file (e.g., filename.conf/.cnf/.cfg), log file (e.g., filename.log), other data types of data structures or a combination thereof. In either example, the proxy agent may access, search, or scan the image to identify the particular portion of the target image in view of the identification image.

In one example, request module 214 may transmit the one or more requests using a Web Distributed Authoring and Versioning (WebDAV) protocol. WebDAV may be an extension to the hypertext transfer protocol (HTTP) that allows clients to perform remote web content authoring operations. The WebDAV protocol may enable image analysis component 112 to access (e.g., read), and/or modify (e.g., change, create) data structures of the target image using the proxy agent running on the node. In one example, the request module may transmit one or more requests with information for identifying a particular target image and a particular portion of the target image using the WebDAV protocol. The proxy agent may retrieve (e.g., copy, download, stream) the target image from an image repository in response to the one or more requests. The proxy agent may access and scan the target image in response to the request to identify data and may transmit the data to image data receiving module 216.

Image data receiving module 216 may receive the data from the target image via the proxy agent and may store the data within a data store (e.g., memory, hard disk) as image data 222. Image data 222 may include textual data, binary data, or other data from an image or about an image. The textual data may be numeric, alphanumeric, other character, or combination thereof. The binary data may be executable code, non-executable code or a portion thereof. The textual or binary data may indicate a state of an image and may be accessed by state determination module 218.

State determination module 218 may analyze image data 222 to determine the state of the target image. The state may be stored as state data 224 within data store 220 and may be associated with the particular target image. State data 224 may indicate information about one or more computer programs, hardware components, configurations, versions, credentials, or other computing features associated with the target image. The computer programs may relate to operating systems (OS), kernels, drivers, middleware, applications, or other programs installed on the image. The hardware components may include physical hardware or virtual hardware (e.g., emulated hardware) such as processors (e.g., CPU, GPU), memory (e.g., main memory), persistent storage (e.g., hard drive), interface adapters (e.g., network interface card, graphics interface card), other hardware, or a combination thereof. The configurations and versions may indicate the functions, features, or settings associated with the computer programs or hardware. For example, the configurations may indicate the network information associated with the image, such as the network identifiers (e.g., IP address, MAC address, Ports) associated with a hardware adapter or computer program of the image. The version information may include version names, numbers, or other information such as security patches, hotfixes, or updates associated with the image. The credentials may include accounts (e.g., user accounts) that are associated with the image. The account may be related to the creation of the image, instantiation of the image, logging into the image, other association, or a combination thereof. State determination module 218 may derive state data 224 from image data 222 using image analysis logic 226.

Image analysis logic 226 may include one or more rules that analyze, filter, or compare the image data 222 to other data. In one example, image data 222 may include a system configuration file and the image analysis logic 226 may include information for analyzing the structure of the configuration file and for identifying a specific parameter to determine a state of the image (e.g., kernel feature). In another example, image data 222 may include a portion of a binary file (e.g., hash) and the image analysis logic 226 may analyze the portion of the binary file to identify the type or version of the binary file. For example, the image analysis logic 226 may compare the portion of the binary file to fingerprints of known binary files. Image analysis logic 226 may also include logic for detecting flaws in the image data 222 or state data 224. The image flaw may be associated with a misconfiguration, a vulnerability, or a performance degradation. The image flaw may be stored as image flaw data 228 and associated with the target image.

Image analysis logic 226 may be updated before, during, and after it is applied to image data 222 and may subsequently be re-applied to image data 222 to update state data 224, image flaw data 228, or a combination thereof. This may enable image analysis component 112 to request image data 222 from the proxy agent a single time and evaluate the image data 222 multiple times using the image analysis logic 226 (e.g., periodic evaluations). This may be advantageous because image analysis logic 226 may be updated to identify additional states (e.g., new features) or flaws (e.g., security vulnerabilities) and image analysis logic 226 may be applied to the image data 222 without re-launching the proxy agent or re-requesting the data from a remote image. In one example, the image analysis component 112 and image analysis logic 226 may be consolidated to a centralized device (e.g., virtualization server or orchestration server) so that the logic can be updated at a single location as opposed to updating each of the proxy agents.

Figure 3:
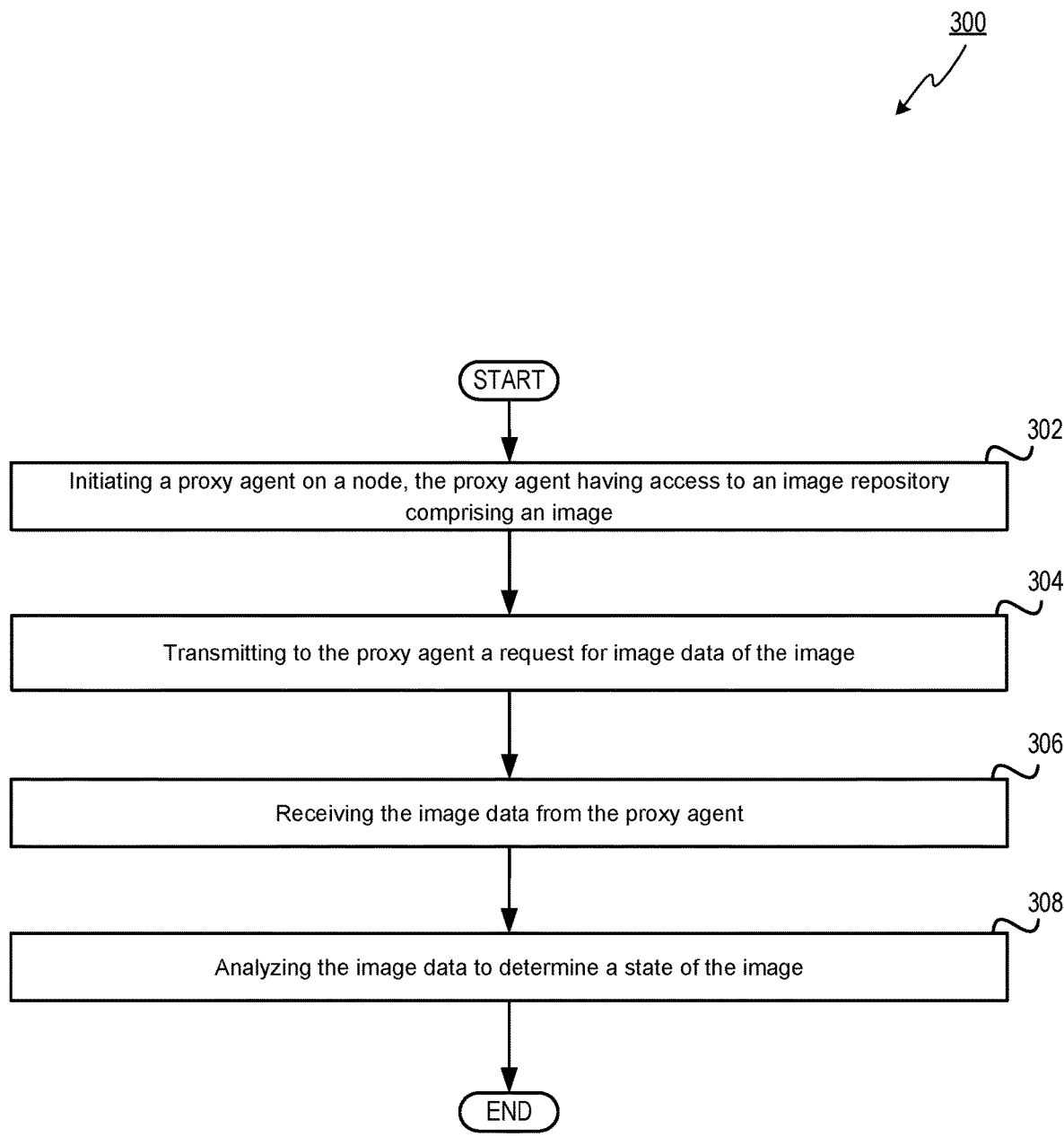
FIG. 3 depicts a flow diagram of an example method for analyzing a computing image using a proxy agent, in accordance with one or more aspects of the present disclosure.
Figure 4:
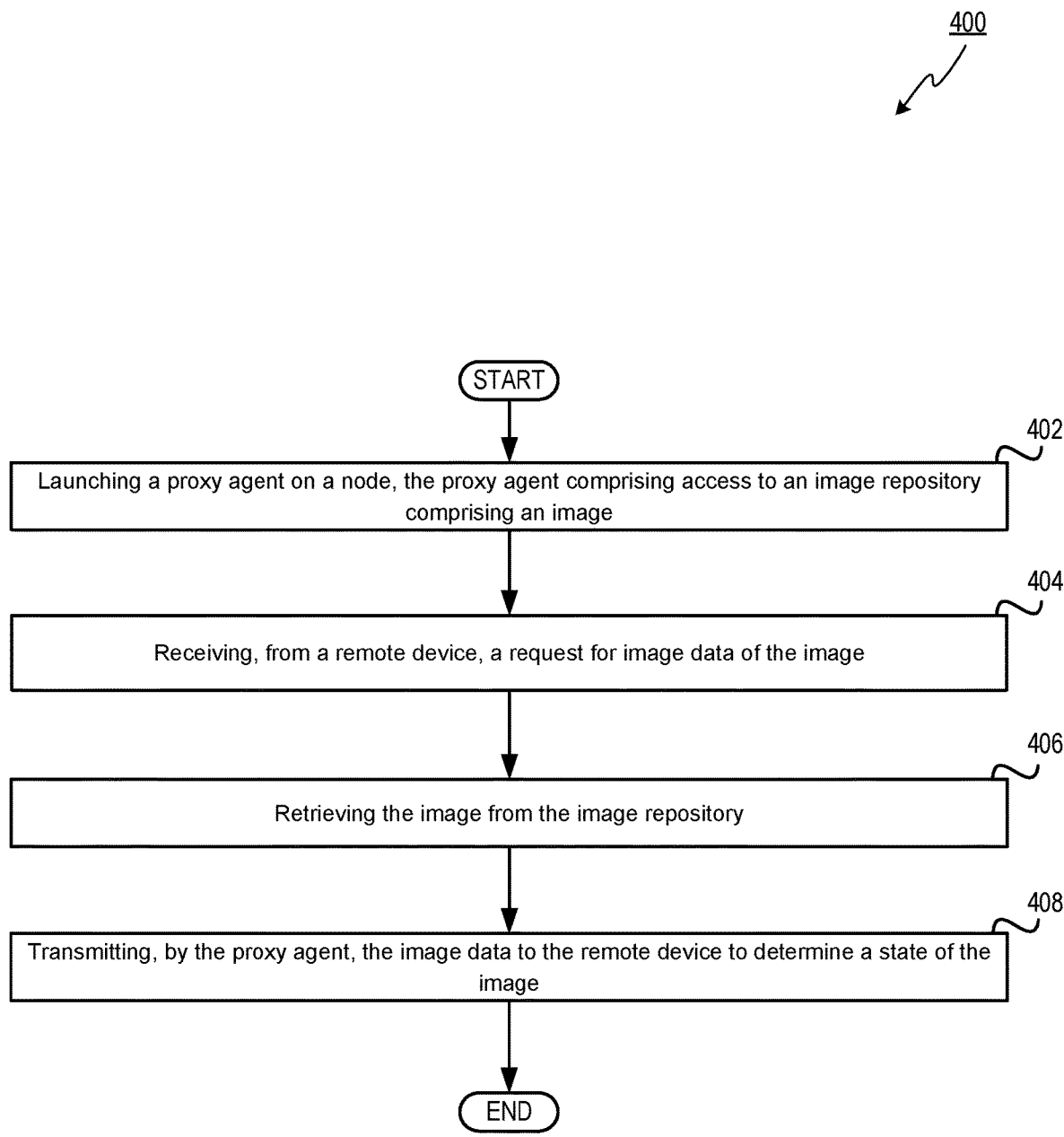
FIG. 4 depicts a flow diagram of another example method for analyzing a computing image using a proxy agent, in accordance with one or more aspects of the present disclosure.

FIGS. 3 and 4 depict flow diagrams for illustrative examples of methods 300 and 400 for analyzing the state of computing images. Methods 300 may be executed by a server device and method 400 may be executed by a client device. Method 300 and 400 may be performed by processing devices that comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing device 120 or system 500 as shown in FIGS. 1 and 5 respectively.

Referring to FIG. 3, method 300 may be performed by processing devices of a computing device and may begin at block 302. At block 302, a processing device may initiate a proxy agent on a node, the proxy agent having access to an image repository comprising an image. In one example, the method may be performed by a management device that is unable to access the image in the image repository. The node may provide operating system level virtualization for a container and the proxy agent may execute within the container. The container may comprise multiple containers associated with a pod that provides an image scanning service on behalf of the management device. Each of the multiple containers may be a user space process executing on a kernel of the node. The image may comprise at least one of a container image, a virtual machine image, or a disk image. In one example, the image may comprise a file system data structure comprising a directory object and a file object.

At block 304, the processing device may transmit to the proxy agent a request for image data of the image. The request may comprise a file system operation to access a portion of the image. In one example, the request may comprise a plurality of network requests, a first network request causing the proxy agent to retrieve (e.g., access, download, stream) the image from the image repository and a second network request causing the proxy agent to search for and identify the image data. In another example, the request may comprise an HTTP request comprising a Web Distributed Authoring and Versioning (WebDAV) operation.

At block 306, the processing device may receive the image data from the proxy agent. The image may be a dormant image and the image data may be retrieved by the proxy agent without executing the image. The image data is retrieved by the proxy agent from a dormant version of the image while the image is being executed and the dormant version of the image comprises a snapshot of the image. In one example, the image data is retrieved by the proxy agent from the image while the image is being executed.

At block 308, the processing device may analyze the image data to determine a state of the image. The state of the image comprises at least one of a program feature, an operating system feature, or a hardware architecture feature. Responsive to completing the operations described herein above with references to block 308, the method may terminate.

In other examples of method 300, the processing device may include one or more additional blocks. One additional block may be associated with detecting whether the state of the image is associated with a flaw. The flaw comprising a misconfiguration, a vulnerability, or a performance degradation. In response to detecting a flaw, the processing device may perform an action, such as an action that initiates a modification of the image. Another additional block may be associated with updating a rule for detecting that the state is associated with a flaw and re-analyzing the stored image data to determine the state of the image.

Referring to FIG. 4, method 400 may be performed by processing devices of a computing device and may begin at block 402. Method 400 may include operations executed by a node device (e.g., node 120), as opposed to a server device (e.g., manager 110). At block 402, a processing device may launch a proxy agent on the node and the proxy agent may comprise access to an image repository comprising an image. The processing device may launch the proxy agent in response to a signal from a management device that is unable to directly access the image in the image repository. In one example, the node may provide operating system level virtualization for a container and the proxy agent may execute within the container. The container may comprise multiple containers associated with a pod that provides an image scanning service on behalf of the management device. Each of the multiple containers may be a user space process executing on a kernel of the node. The image may comprise at least one of a container image, a virtual machine image, or a disk image. In one example, the image may comprise a file system data structure comprising a directory object and a file object.

At block 404, the processing device may receive, from a remote device, a request for image data of the image. The request may comprise a file system operation to access a portion of the image. In one example, the request may comprise a plurality of network requests, a first network request causing the proxy agent to retrieve (e.g., access, download, stream) the image from the image repository and a second network request causing the proxy agent to search for and identify the image data. In another example, the request may comprise an HTTP request comprising a Web Distributed Authoring and Versioning (WebDAV) operation.

At block 406, the processing device may retrieve the image from the image repository. In one example, the image may be a dormant image and the image data may be retrieved by the proxy agent without executing the image. In another example, the image data may be retrieved by the proxy agent from a dormant version of the image while the image is being executed and the dormant version of the image may comprise a snapshot of the image. In yet another example, the image data may be retrieved by the proxy agent from the image while the image is being executed.

At block 408, the processing device may transmit, by the proxy agent, the image data to the remote device to determine a state of the image. The state of the image comprises at least one of a program feature, a package feature, an operating system feature, or a hardware architecture feature. Responsive to completing the operations described herein above with references to block 408, the method may terminate.

Figure 5:
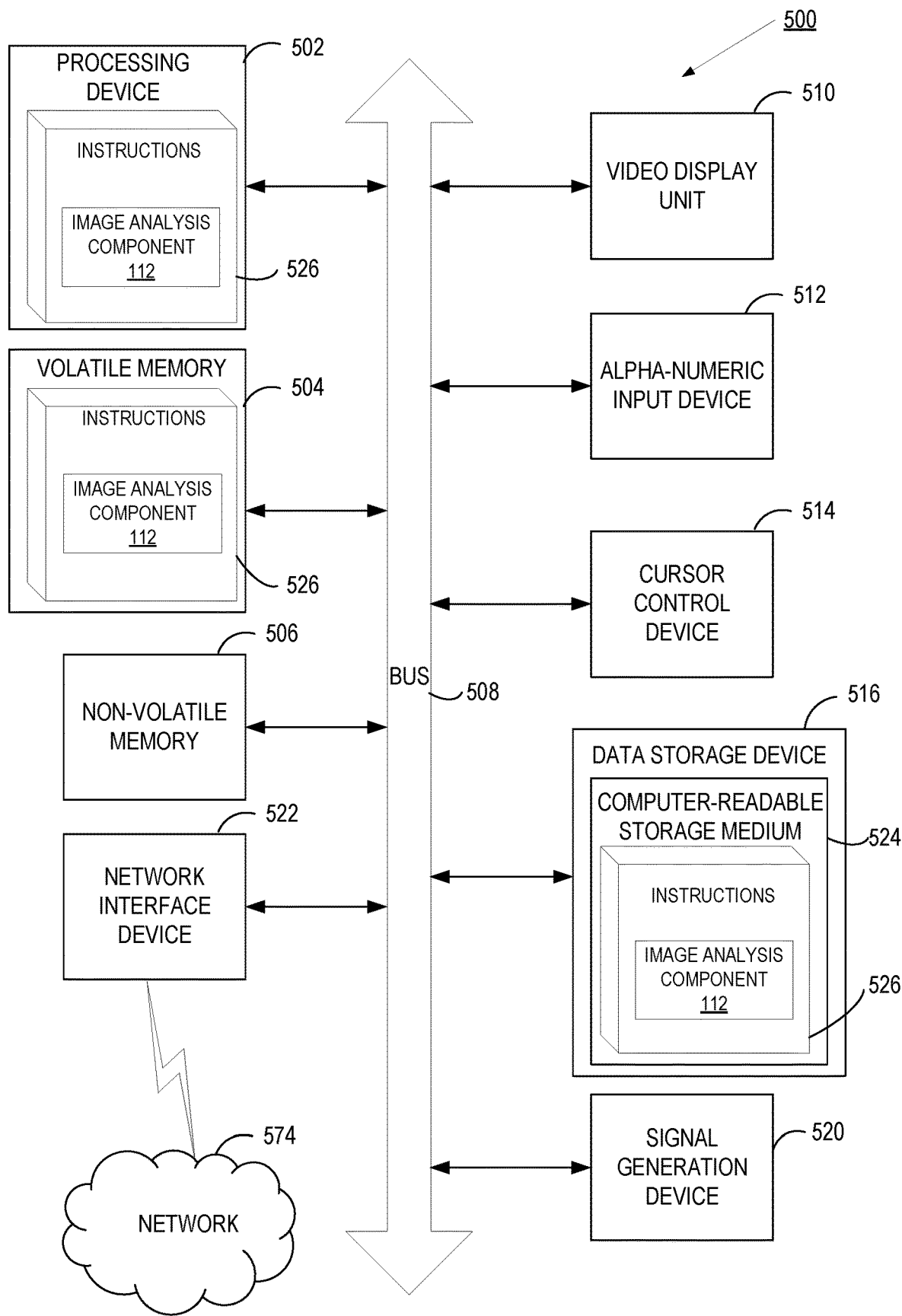
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 500 may correspond to manager 110 or node 120 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 400 and for encoding image analysis component 112 and modules illustrated in FIG. 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   initiating, by a first computing device, an execution of a proxy agent on a second computing device over a network, the proxy agent having access to an image repository comprising an image, wherein the first computing device has no read access to the image;
   transmitting, by the first computing device to the proxy agent, a request for image data of the image, wherein the request comprises information indicating a particular portion of the image to be read using a file system operation;
   storing, by the first computing device, the image data received from the proxy agent in a persistent data storage device, wherein the image data comprises data at the particular portion of the image; and
   analyzing the image data in view of one or more rules to determine a state of the image, wherein the state indicates a status of at least one of a computer program feature, an operating system feature, or a hardware feature.

2. The method of claim 1, wherein the first computing device comprises a node that provides operating system level virtualization for a container, and wherein the proxy agent executes within the container.

3. The method of claim 1, wherein the image is a dormant image and the image data is retrieved without executing the image.

4. The method of claim 1, wherein the image comprises at least one of a container image, a virtual machine image, or a disk image.

5. The method of claim 1, wherein the request comprises a plurality of network requests, and wherein the plurality of network requests comprise a first network request to retrieve the image from the image repository and a second network request to identify the image data.

6. The method of claim 1, wherein the request comprises the file system operation to access the portion of the image.

7. The method of claim 1, wherein the request comprises an HTTP request comprising a Web Distributed Authoring and Versioning (WebDAV) operation.

8. The method of claim 1, further comprising:
   updating the one or more rules to identify a flaw; and
   analyzing the image data in view of the updated one or more rules to determine a second state of the image, wherein the second state indicates the flaw is associated with the at least one computer program feature, operating system feature, or hardware feature.

9. The method of claim 8, further comprising:
   detecting whether the image is associated with the flaw, the flaw comprising a misconfiguration, a vulnerability, or a performance degradation; and
   performing an action in view of the flaw, wherein the action initiates a modification of the image.

10. The method of claim 2, wherein the container comprises multiple containers associated with a pod that provides an image scanning service, wherein each of the multiple containers comprises a user space process managed by a kernel of the node.

11. The method of claim 1, wherein the first computing device functions as a management device that is unable to access the image in the image repository and the second computing device is able to access the image in the image repository.

12. The method of claim 1, wherein the image comprises a file system data structure comprising a directory object and a file object.

13. The method of claim 8, wherein the updating the one or more rules comprises applying multiple updates to the one or more rules and wherein the first computing device reanalyzes the image data after each of the multiple updates to the one or more rules.

14. A system comprising:
    a memory;
    a processing device of a first computing device operatively coupled to the memory, the processing device to:
       initiate a proxy agent on a second computing device over a network, the proxy agent having access to an image repository comprising an image, wherein the first computing device has no read access to the image;
       transmit to the proxy agent a request for image data of the image, wherein the request comprises information indicating a particular portion of the image to be read using a file system operation;
       store the image data received from the proxy agent in a persistent data storage device, wherein the image data comprises data at the particular portion of the image; and analyze the image data in view of one or more rules to determine a state of the image, wherein the state indicates a status of at least one of a computer program feature, an operating system feature, or a hardware feature.

15. The system of claim 14, wherein the first computing device comprises a node that provides operating system level virtualization for a container and wherein the proxy agent executes within the container.

16. The system of claim 14, wherein the image is a dormant image and the image data is retrieved without executing the image.

17. A non-transitory machine-readable storage medium storing instructions that cause a processing device of a first computing device to:

cause a proxy agent to launch on a second computing device over a network, the proxy agent having access to an image repository comprising an image, wherein the first computing device has no read access to the image;

transmit to the proxy agent a request for image data of the image, wherein the request comprises information indicating a particular portion of the image to be read using a file system operation;

store the image data received from the proxy agent in a persistent data storage device, wherein the image data comprises data at the particular portion of the image; and analyze the image data in view of one or more rules to determine a state of the image, wherein the state indicates a status of at least one of a computer program feature, an operating system feature, or a hardware feature.

18. The non-transitory machine-readable storage medium of claim 17, wherein the image is a dormant image and the image data is retrieved without executing the image.

* * * * *